United States Patent
Auterinen

(10) Patent No.: US 9,021,357 B2
(45) Date of Patent: *Apr. 28, 2015

(54) SYSTEM AND METHOD FOR ENABLING COLLABORATIVE MEDIA STREAM EDITING

(71) Applicant: Core Wireless Licensing S.A.R.L., Luxembourg (LU)

(72) Inventor: Otso Auterinen, Helsinki (FI)

(73) Assignee: Core Wireless Licensing S.A.R.L., Luxembourg (LU)

(*) Notice: Subject to any disclaimer, the term of this patent is extended or adjusted under 35 U.S.C. 154(b) by 0 days.

This patent is subject to a terminal disclaimer.

(21) Appl. No.: 14/340,732

(22) Filed: Jul. 25, 2014

(65) Prior Publication Data

US 2014/0337738 A1 Nov. 13, 2014

Related U.S. Application Data

(63) Continuation of application No. 11/167,567, filed on Jun. 27, 2005, now Pat. No. 8,826,136.

(51) Int. Cl.
| | |
|---|---|
| *G06F 3/048* | (2013.01) |
| *G06F 3/0484* | (2013.01) |
| *G06F 17/30* | (2006.01) |
| *G11B 27/00* | (2006.01) |
| *G11B 27/031* | (2006.01) |
| *H04L 29/06* | (2006.01) |
| *H04L 29/08* | (2006.01) |
| *G06F 3/0481* | (2013.01) |

(52) U.S. Cl.
CPC ...... *G06F 3/04842* (2013.01); *G06F 17/30056* (2013.01); *G06F 17/30867* (2013.01); *G11B 27/005* (2013.01); *G11B 27/031* (2013.01); *H04L 29/06027* (2013.01); *H04L 65/4092* (2013.01); *H04L 65/602* (2013.01); *H04L 65/80* (2013.01); *H04L 67/306* (2013.01); *G06F 3/0481* (2013.01); *H04L 65/403* (2013.01)

(58) Field of Classification Search
CPC ............. G11B 27/34; G06F 3/0482; H04N 21/44222; H04N 21/812
See application file for complete search history.

(56) References Cited

U.S. PATENT DOCUMENTS

| | | | | |
|---|---|---|---|---|
| 5,666,499 | A * | 9/1997 | Baudel et al. | 715/808 |
| 6,199,082 | B1 * | 3/2001 | Ferrel et al. | 715/205 |
| 6,665,841 | B1 * | 12/2003 | Mahoney et al. | 715/204 |
| 6,687,878 | B1 * | 2/2004 | Eintracht et al. | 715/201 |
| 6,789,105 | B2 * | 9/2004 | Ludwig et al. | 709/204 |
| 6,829,646 | B1 * | 12/2004 | Philyaw et al. | 709/228 |
| 7,343,326 | B2 * | 3/2008 | Westphal | 705/26.7 |
| 7,343,555 | B2 * | 3/2008 | Ko et al. | 709/201 |
| 7,590,562 | B2 * | 9/2009 | Stoppelman | 705/26.7 |
| 2002/0112082 | A1 * | 8/2002 | Ko et al. | 709/246 |
| 2002/0120925 | A1 * | 8/2002 | Logan | 725/9 |
| 2002/0161664 | A1 * | 10/2002 | Shaya et al. | 705/26 |
| 2008/0052739 | A1 * | 2/2008 | Logan | 725/25 |

* cited by examiner

*Primary Examiner* — Phenuel Salomon
(74) *Attorney, Agent, or Firm* — Winstead PC

(57) ABSTRACT

A system and method for editing multimedia content. A server transmits multimedia content to a plurality of electronic devices. Each of the plurality of electronic devices enables a user to perform at least one action in relation to the multimedia content. A a voting engine gathers information concerning the actions performed by users in relation to the multimedia content transmitted to the electronic devices. In response to the information gathered by the voting engine, the multimedia content is modified based upon predefined criteria. The modified multimedia content is subsequently provided to later users.

15 Claims, 5 Drawing Sheets

SYSTEM AND METHOD FOR ENABLING COLLABORATIVE MEDIA STREAM EDITING

CROSS-REFERENCE TO RELATED APPLICATIONS

This application is a continuation of U.S. patent application Ser. No. 11/167,567, filed on Jun. 27, 2005. U.S. patent application Ser. No. 11/167,567 is incorporated herein by reference.

FIELD OF THE INVENTION

The present invention relates generally to the editing of multimedia content. More particularly, the present invention relates to the collaborative editing of multimedia content by a plurality of users based upon actions of the users.

BACKGROUND OF THE INVENTION

Video images are extremely attractive and effective in conveying information to people. This is due in large part to the exceptional capability of human eyes to process a viewed image. A person can view a very brief video clip, yet still obtain and retain important information from the clip. This is clearly demonstrated by the prevalence of television commercials and music videos comprising very short "cuts" or video clips.

In recent years, devices for recording video streams have become increasingly commonplace. In particular, camera phones and digital cameras have exploded in popularity, creating an enormous multimedia recorder base. Additionally, Internet-connected personal computers and other communication-capable devices make interactive media stream consumption possible, and the storage capability in these devices has become very inexpensive.

At the same time that the ability to record video streams has progressed among users, "collaborative editing" has also become more commonplace. In collaborative editing, multiple users are capable of working together in order to edit a video stream as necessary or desired. For example, multiple users can collaborate through different devices to cut, combine, or otherwise modify video streams for future viewing. However, even though these types of edits can be made to video streams by multiple users simultaneously, these edits are of the "active" variety, i.e., through the use of multimedia editing programs or similar software, where the purpose of the activity is to edit the stream. Other systems comprise "unorganized" collaborative editing, where the individual users are not aware of others who may also be influencing the editing process. In such systems, the resulting content may be the result of a "behaviour analysis" process, wherein the actions of the individual users is used as an input.

SUMMARY OF THE INVENTION

The present invention provides for a system of collaborative editing of media streams based upon actions of earlier viewers. The present invention enables collaborative editing and consumption of media streams of raw material produced by the greater public or members of a community. The raw media stream is edited or refined according to the actions of those individuals who view the material, resulting in a "passive" editing process. The viewer actions are generated with a controller device, such as a mobile phone, that uses a control connection to a media processing server or separate voting engine that may be attached or integrated to the playback device.

Collaborative editing according to the present invention can result in the creation of entirely new compositions. The collaborative editing of the present invention may be either explicit or implicit and may affect either the entire media stream or only a portion of the stream. In the present invention, a media element or component can be presented in a new context, as a part of a composition where the element has not been previously included, or has been included in some other manner. In the present invention, a new video clip or picture can be used to present an event or place which was previously presented in the composition. Media elements may also be combined by, for example, mixing a new soundtrack with a video or picture.

The present invention may also involve the manipulation of audio information in addition to video information. For example, implicit collaboration may be used to adjust the volume of a selected audio portion of a media stream. Additionally, if users choose their own music to be played with a video clip, the music selections may be used to select a soundtrack for future users.

The present invention provides a significant improvement over current editing systems. With collaborative editing, the creation of highly usable media streams can be accomplished with shared efforts by viewers without the need for paid or professional editing work. Multimedia messaging also becomes more user friendly with the present invention by better exploiting human capabilities in playback situations. Collaborative editing according to the present invention can occur either explicitly or implicitly, and the editing can occur continuously, resulting in a continuous refinement of the media stream at issue.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention is based on the automated composition of a raw media stream from multi media or plain still image material recorded by individuals or observation cameras, such as web cams. A typical composition method according to the present invention involves collecting media items offered in a category selected by the recording individual in a sequence according to recording time.

The raw media stream is edited or refined according to actions of those individuals who view the material. A typical editing method according to the present invention involves a system that obtains information concerning the viewing actions of individual viewers. When an image or stream is displayed that is of a particular interest to an individual, the individual users can browse the multimedia stream in many ways. The viewing actions that are involved in the editing process can comprise typical implicit editing methods, and the outcome is based upon an analysis of the actions by those individuals who view the material. Actions that can be used in the collaborative editing process include, but are not limited to, the use of an "accelerated playback" mode, viewing the stream at a normal playback speed, repeatedly viewing the same portion of content, adjusting the volume, bass, balance, fade, treble or other audio-related aspects of the content, zooming within the multimedia content, panning within the multimedia content, or viewing the content in slow motion. As used herein, "panning" refers to, if a picture ratio in a video is wider than a device's display, adjusting the positioning of the video so that a selected portion of the video remains viewable by the user. All of the above actions can be considered as indications of interest to that portion of the media stream. Information concerning all of these actions can be consolidated with a conventional data mining technique or similar method in order to refine the appears appearance of the media stream for subsequent users and/or viewers.

Figure 4:
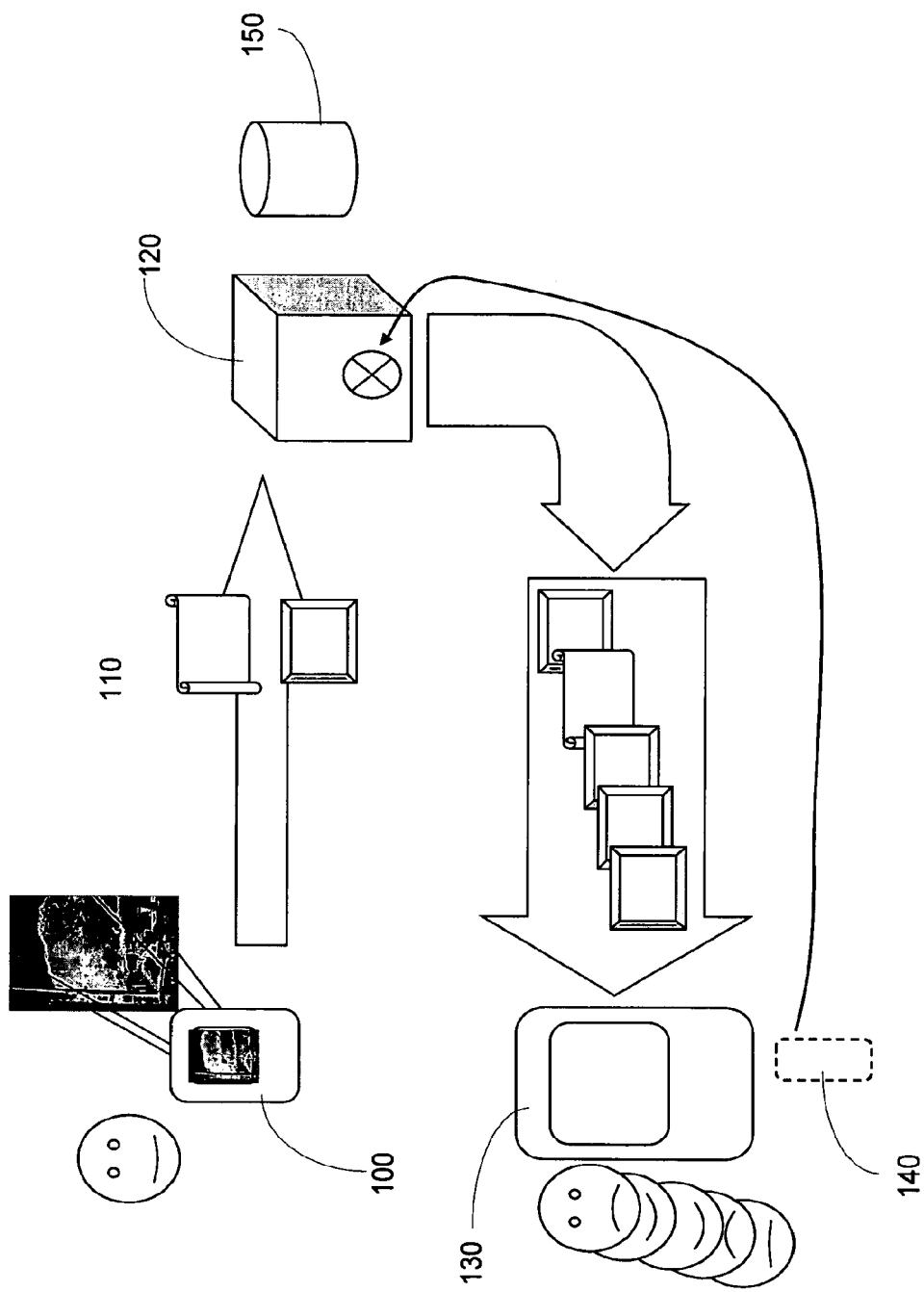
FIG. 4 is a representation of a system including a recording device, a media processing server, and a playback device according to one embodiment of the present invention.

FIG. 4 is a representation showing a collaborative media stream editing process according to one embodiment of the present invention. As shown in FIG. 4, a recording device 100 is used to capture an image or a video stream, referred to herein generically as content 110, and transmit the content 110 to a processing server 120. The recording device 100 can take a variety of forms, including, but not limited to, a digital movie recorder, a conventional movie recorder, a digital camera, and a mobile telephone with built-in camera capabilities.

The processing server 120 transmits the content 110 to at least one playback device 130. The playback device 130 can also take a wide variety of forms, including virtually any device that includes some form of display unit. The playback device 130 can include either a built-in or an otherwise associated controller 140 that enables the viewer to manipulate the media stream. The controller 140 can include items such as a joystick, keyboard keys, touch pads, a touch-sensitive display, or a variety of other features that allow the viewer to manipulate the content 110. In one embodiment of the invention, a mobile telephone serves as the controller 140.

The system depicted in FIG. 4 also includes a voting engine 150. The voting engine 150 is used to collect information concerning the activities of each individual viewer. The voting engine 150 keeps track of how many viewers perform particular actions around individual content segments, including whether viewers fast forward past a segment, whether a viewer watches a segment multiple times, etc. The voting engine 150 is incorporated into the processing server 120 in one embodiment of the invention. The voting engine 150 can also be a stand-alone device. In addition, the voting engine 150 can also be incorporated into the recording device 100, into one or more playback devices 130, or into one or more controllers 140.

In one embodiment of the invention, several individuals simultaneously view the media stream in a broadcast mode using respective playback devices 130. The playback devices 130 can each include their own controller 140 or other mechanism, or a single playback device 130 can be connected to multiple controllers 140, where individuals can view and control the content 120 through one of the controllers. Each user or viewer can use a controller 140 to generate viewer actions. The viewer actions are processed by the voting engine 150. This information can be used by the voting engine 150 to generate an altered or edited appearance of the media stream and to control the playback of the media stream.

Editing actions that can be implemented by a playback device 130 in order to alter the appearance of the content include, but are not limited to: adjusting the time to keep a still image on the display, selecting the part of a video clip to be exhibited at a slower speed, selecting a still image or frame to be shown from a video clip when browsing a video stream, adjusting the volume, bass, treble, balance, fade or other audio-related aspects of a content portion, zooming within the multimedia content, panning within the multimedia content, and skipping a portion of a video stream.

Editing actions, such as those discussed above, result in the generation of a modified appearance for the media stream for future viewing. For example, in the event that several viewers "rewind" a portion of a video stream in order to watch the portion more than one time, it may be determined that that particular portion should be given more prominence when exhibited to future users. As a result, the media processing server 120 may adjust the media stream for future users so that the particular portion is shown in slow motion. Conversely, portions which are skipped over by users could be deemphasized for future viewers. Other possibilities include the showing of a more detailed view of the content portion, an accelerated rate of exhibiting the piece of content, or other actions. In any event, the end result of this collaborative editing process is the subsequent display of the content in a modified fashion that is likely to be of more interest to the user than the content in an unmodified form.

It should be noted that the media stream can include not only video and/or still images but also other media forms such as audio. In such situations, the different portions can edited independent from each other in one embodiment of the invention. For example, an audio portion of a media stream can be independently edited without editing the video or image portion of the content.

In one particular implementation of the present invention, a basic mobile telephone with a built-in camera is used as a recording device 100, which is used to post content 110 to a selected raw media channel. The media processing server 120 receives posts to the raw media channel and creates online and browsing media streams according to the actions of the individual viewers. A playback device, such as a multimedia playback-capable telephone or personal computer, is able to receive and play the stream. According to this embodiment of the invention, a number of the playback devices need to have the ability to obtain information regarding the viewer actions and to communicate information about the actions to the media processing server 120. Some playback devices may be able to react to viewer actions locally while, at the same time, consuming a media stream received from the media processing server 120.

Figure 5:
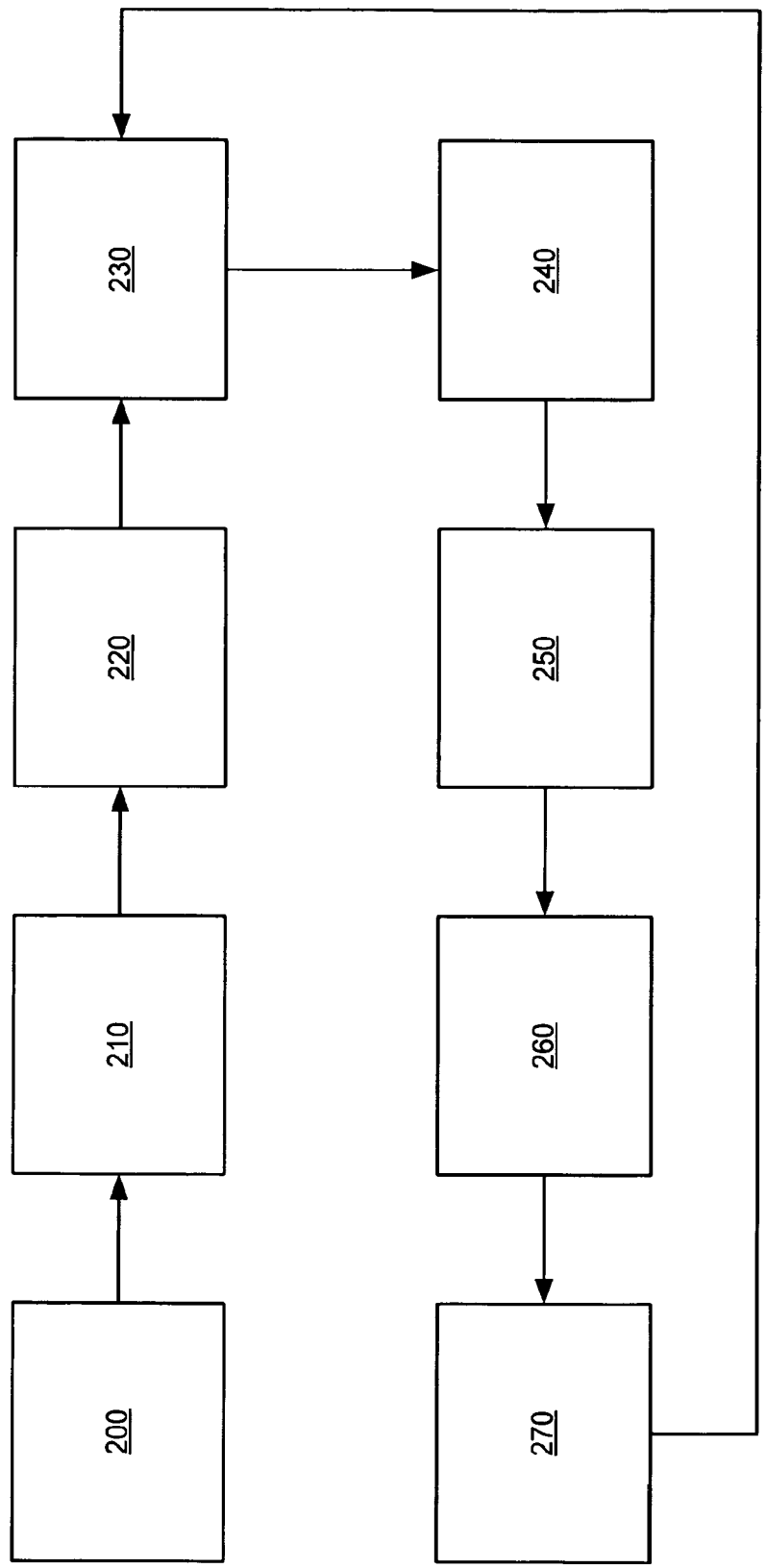
FIG. 5 is a flow chart showing the implementation of one embodiment of the present invention.

FIG. 5 is a flow chart showing the implementation of one embodiment of the present invention. At 200, a recording device 100 records content 110 from a source. In a particular embodiment of the invention, this can be in the form of live-action recording of video, although it is also possible that the content 110 can take the form of a series of still images, or the content 110 can take other forms. At step 210, the content 110 is transmitted to the media processing server 120. It should be noted that the content 110 can be transmitted in real time to the media processing server 120, or the content 110 can be stored in the recording device 110 and transmitted at a later time to the media processing server. At step 220, the content 110 is transmitted to at least one playback device 130. At step 230, the content 110 is viewed by at least one user. At step 240, each user uses his or her controller 140 to view the content 110 in a specific way, e.g., by fast-forwarding through portions, playing portions in slow motion, etc. At step 250, information concerning how the content 110 is viewed is transmitted to the voting engine 150, which collects this information from each user that views the content 110. At step 260, the voting engine uses the information to generate modified content, which is transmitted to subsequent viewers at step 270.

The generation of modified content can occur according to predefined criteria. "Predefined criteria" can be both relative and absolute and can be based upon the number of viewers of content, the number of consecutive viewers performing the same action, the frequency of performing a particular action by viewers or a wide variety of other suitable measures. For example, the predefined criteria can state that, if more than a certain percentage of viewers fast-forward through a particular segment, then the modified content should exhibit that portion of the content at an accelerated rate in the future. The content 110 then continues to be viewed and modified over time. The generation of modified content can occur through the use of an engine having an artificial intelligence. In this situation, the objective of the artificial intelligence is to generate content which would match the needs and tastes of an average consumer, or content which would match the needs of a "key user" of a specific target group.

According to one embodiment of the invention, a particular playback device 130 may access the content 110 with an indication to view the content 110 only when it has been altered and edited such that the content has obtained a desired level of "maturity" quality.

Figure 1:
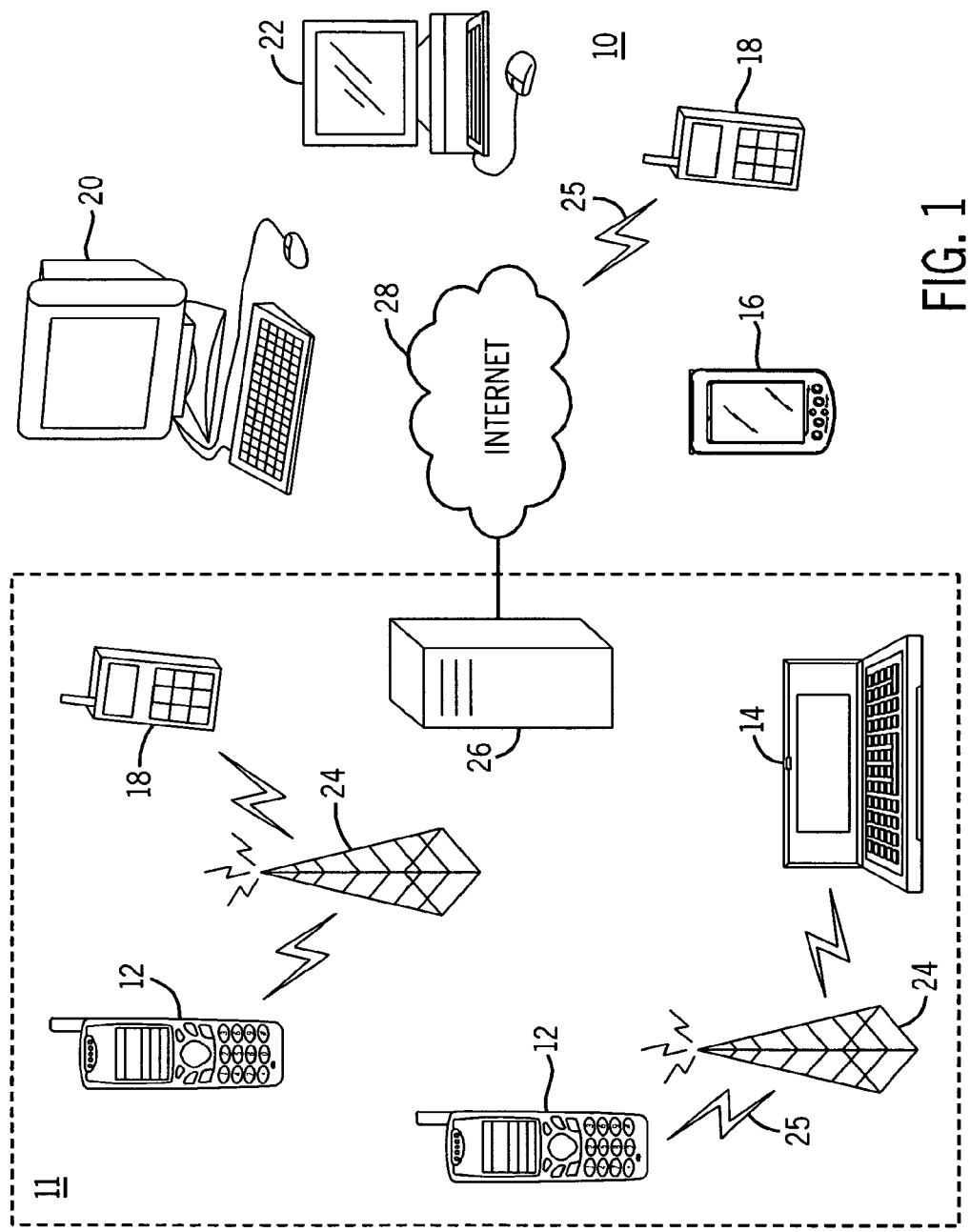
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
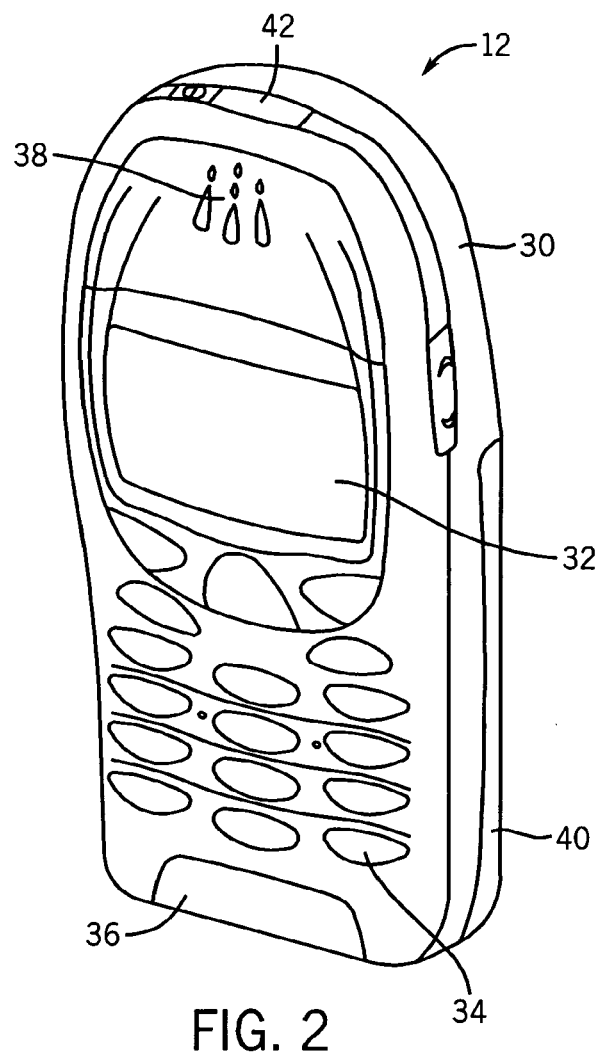
FIG. 2 is a perspective view of a mobile telephone that can be used in the implementation of the present invention.
Figure 3:
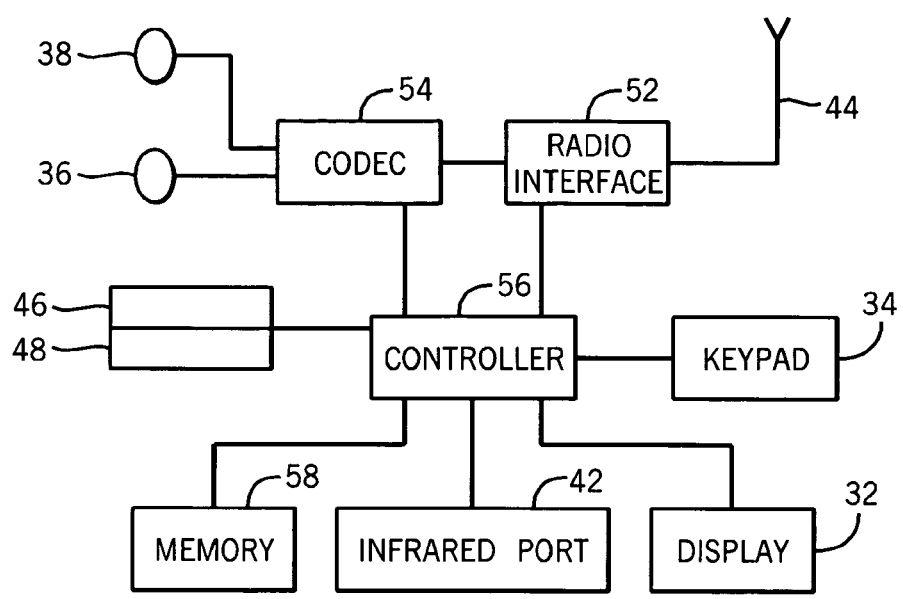
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:
1. A method, comprising:
receiving, at a processing server, a multimedia content from a recording device;
storing, at the processing server the multimedia content;
providing the multimedia content to a plurality of viewers;
collecting information, at the processing server, of activities of each of the plurality of viewers, wherein the collected information alters an appearance of the multimedia content and controls playback of the multimedia content; and in response to a frequency of the activities performed by each of the plurality of viewers satisfying a predefined criteria, modifying the multimedia content accordingly, wherein the multimedia content is modified in a manner selected from the group consisting of adjusting time to keep a still image on a display, selecting a part of a video clip to be exhibited at a slower speed, selecting a still image or frame to be shown from a video clip when browsing a video stream, adjust a volume, bass, treble, balance, fade or other audio-related aspects of a content portion zooming within the multimedia content, panning with the multimedia content, skipping a portion of a video portion, or some combination thereof.

2. The method of claim 1, wherein the predefined criteria comprises at least one of a number of consecutive viewers performing the same action, a frequency of performing a particular action, and whether a certain percentage of viewers perform a particular action.

3. The method of claim 1 further comprising:
providing the modified multimedia content to at least one subsequent viewer,
wherein tracked types of actions comprise at least one of fast forwarding through a portion of the multimedia content, replaying a portion of the multimedia content, viewing a portion of the multimedia content at a slower-than-normal rate, skipping a portion of the multimedia content, and manipulating audio-related aspects of the multimedia content.

4. The method of claim 1, wherein the plurality of viewers uses a controller to perform tracked type of actions.

5. The method of claim 1, wherein the recording device is one of a digital movie recorder, a conventional movie recorder, a digital camera, and a mobile telephone.

6. An apparatus, comprising:
a processor; and
a memory unit operatively connected to the processor and including:
computer code for enabling the apparatus to receive a multimedia content from a recording device;
computer code for enabling the apparatus to store the multimedia content;
computer code for enabling the apparatus to provide the multimedia content to a plurality of viewers;
computer code for collecting information of activities of each of the plurality of viewers, wherein the collected information alters an appearance of the multimedia content and controls playback of the multimedia content;
computer code for enabling the apparatus to receive multimedia content from a remote location; and
in response to a frequency of the activities performed by each of the plurality of viewers computer code for enabling the apparatus to satisfy a predefined criteria, to modify the multimedia content accordingly, wherein the multimedia content is modified in a manner selected from the group consisting of adjusting time to keep a still image on a display, selecting a part of a video clip to be exhibited at a slower speed, selecting a still image or frame to be shown from a video clip when browsing a video stream, adjust a volume, bass, treble, balance, fade or other audio-related aspects of a content portion zooming within the multimedia content, panning with the multimedia content, skipping a portion of a video portion or some combination thereof.

7. The apparatus of claim 6, wherein the predefined criteria comprises at least one of a number of consecutive viewers performing the same action, a frequency of performing a particular action, and whether a certain percentage of viewers perform a particular action.

8. The apparatus of claim 6 further comprising:
computer code for enabling the apparatus to provide the modified multimedia content to at least one subsequent viewer, wherein tracked types of actions comprise at least one of fast forwarding through a portion of the multimedia content, replaying a portion of the multimedia content, viewing a portion of the multimedia content at a slower-than-normal rate, skipping a portion of the multimedia content, and manipulating audio-related aspects of the multimedia content.

9. The apparatus of claim 6, wherein the plurality of viewers uses a controller to perform tracked type of actions.

10. The apparatus of claim 6 wherein the recording device is one of a digital movie recorder, a conventional movie recorder, a digital camera, and a mobile telephone.

11. A tangible non-transitory computer-readable storage medium carrying one or more sequences of one or more instructions, which when executed by one or more processors, direct an apparatus to:
receive a multimedia content from a recording device;
store, at a memory in the apparatus, the multimedia content;
provide the multimedia content to a plurality of viewers; and
collect information of activities of each of the plurality of viewers, wherein the collected information alters an appearance of the multimedia content and controls playback of the multimedia content; and
in response to a frequency of the activities performed by each of the plurality of viewers computer code for satisfying a predefined criteria, modifying the multimedia content accordingly, wherein the multimedia content is modified in a manner selected from the group consisting of adjusting time to keep a still image on a display, selecting a part of a video clip to be exhibited at a slower speed, selecting a still image or frame to be shown from a video clip when browsing a video stream, adjust a volume, bass, treble, balance, fade or other audio-related aspects of a content portion zooming within the multimedia content, panning with the multimedia content, skipping a portion of a video portion, or some combination thereof.

12. The computer-readable storage medium of claim 11, wherein the predefined criteria comprises at least one of a number of consecutive viewers performing the same action, a frequency of performing a particular action, and whether a certain percentage of viewers perform a particular action.

13. The computer-readable storage medium of claim 11 further comprising providing the modified multimedia content to at least one subsequent viewer, wherein tracked types of actions comprise at least one of fast forwarding through a portion of the multimedia content, replaying a portion of the multimedia content, viewing a portion of the multimedia content at a slower-than-normal rate, skipping a portion of the multimedia content, and manipulating audio-related aspects of the multimedia content.

14. The computer-readable storage medium of claim 11, wherein the plurality of viewers uses a controller to perform tracked type of actions.

15. The computer-readable storage medium of claim 11, wherein the recording device is one of a digital movie recorder, a conventional movie recorder, a digital camera, and a mobile telephone.

* * * * *